(12) United States Patent
Zhang et al.

(10) Patent No.: US 11,745,154 B2
(45) Date of Patent: Sep. 5, 2023

(54) HIGH-TEMPERATURE AEROGEL HEAT INSULATION COATING, PREPARATION EQUIPMENT AND USE METHOD FOR PREPARATION EQUIPMENT

(71) Applicant: CNBM Technology Innovation Academy (Shandong) Co., Ltd., Zaozhuang (CN)

(72) Inventors: Zhonglun Zhang, Zaozhuang (CN); Mingming Wang, Zaozhuang (CN)

(73) Assignee: CNBM Technology Innovation Academy (Shandong) Co., Ltd., Zaozhuang (CN)

( * ) Notice: Subject to any disclaimer, the term of this patent is extended or adjusted under 35 U.S.C. 154(b) by 0 days.

(21) Appl. No.: 18/156,371

(22) Filed: Jan. 18, 2023

(65) Prior Publication Data
US 2023/0226507 A1    Jul. 20, 2023

(30) Foreign Application Priority Data
Jan. 20, 2022    (CN) .......................... 202210068634.5

(51) Int. Cl.
| B01F 35/00 | (2022.01) |
| B01F 35/32 | (2022.01) |
| C09D 7/65 | (2018.01) |
| B01F 35/33 | (2022.01) |
| C09D 7/40 | (2018.01) |
| C09D 191/00 | (2006.01) |
| C09D 7/63 | (2018.01) |
| C09D 7/61 | (2018.01) |

(Continued)

(52) U.S. Cl.
CPC ........ *B01F 35/3204* (2022.01); *B01F 35/323* (2022.01); *B01F 35/33* (2022.01); *C09D 7/20* (2018.01); *C09D 7/61* (2018.01); *C09D 7/63* (2018.01); *C09D 7/65* (2018.01); *C09D 7/70* (2018.01); *C09D 191/00* (2013.01); *B01F 2035/99* (2022.01)

(58) Field of Classification Search
CPC ........ B01F 35/3204; B01F 35/33; C09D 7/65; C09D 7/61; C09D 7/20; C09D 7/70; C09D 7/63; C09D 191/00
See application file for complete search history.

(56) References Cited

U.S. PATENT DOCUMENTS

| 5,865,538 A * | 2/1999 | Walker .................... B01F 29/64 |
| | | 366/209 |
| 2019/0314778 A1* | 10/2019 | Ahn ........................ B01F 27/92 |

FOREIGN PATENT DOCUMENTS

| CN | 108393151 A | 8/2018 |
| CN | 108435090 A | 8/2018 |

(Continued)

*Primary Examiner* — Anshu Bhatia
(74) *Attorney, Agent, or Firm* — Nitin Kaushik

(57) ABSTRACT

The present disclosure discloses a high-temperature aerogel heat insulation coating, preparation equipment and a use method for the preparation equipmen. A supporting leg frame is arranged on the outer side wall of the reaction tank; a storage cavity is formed in the upper outer box; a dispersing shaft is arranged in the storage cavity; dispersing blades are installed on the dispersing shaft; a dispersing motor and a material guiding pipe are arranged outside the upper outer box; an unloading mechanism is arranged under the reaction tank; and an exhaust hole and a feeding hole are formed in the outer part of the reaction tank.

2 Claims, 12 Drawing Sheets

(51) Int. Cl.
*C09D 7/20* (2018.01)
*B01F 35/90* (2022.01)

(56) References Cited

FOREIGN PATENT DOCUMENTS

| | | | |
|---|---|---|---|
| CN | 108479611 | A | 9/2018 |
| CN | 208049861 | U | 11/2018 |
| CN | 208975807 | U | 6/2019 |
| CN | 209866058 | U | 12/2019 |
| CN | 210395490 | U | 4/2020 |
| CN | 210410617 | U | 4/2020 |
| CN | 210787095 | U | 6/2020 |
| CN | 111471358 | A | 7/2020 |
| CN | 112226103 | A | 1/2021 |
| CN | 212915484 | U | 4/2021 |
| CN | 113145212 | A | 7/2021 |
| CN | 113402930 | A | 9/2021 |
| CN | 215196703 | U | 12/2021 |
| WO | WO2021083424 | A2 | 5/2021 |

\* cited by examiner

HIGH-TEMPERATURE AEROGEL HEAT INSULATION COATING, PREPARATION EQUIPMENT AND USE METHOD FOR PREPARATION EQUIPMENT

CROSS-REFERENCE TO RELATED APPLICATIONS

The application claims priority to Chinese patent application 2022100686345, filed on Jan. 20, 2022, the entire contents of which are incorporated herein by reference.

TECHNICAL FIELD

The present disclosure. relates to the technical field of heat insulation coatings, in particular to a high-temperature aerogel heat insulation coating, preparation equipment and a use method for the preparation equipment.

BACKGROUND

As a kind of novel light nano-porous amorphous solid materials, aerogel has the characteristics of controllable, nanostructure, adjustable refractive index, specific surface area and the like and is a. solid material with minimal refractive index, very low heat conductivity and very low acoustic velocity at present. Silicon dioxide aerogel has annihilation ratios to infrared light and visible light, reaching 100 or above; can effectively allow sunlight to penetrate; prevents infrared radiation at an environment temperature; and thus is an ideal transparent thermal insulation material. A coating is coated on the outer surface of an object and closely binds to the coated object together and is often used for a high-temperature industrial kiln. At present, in order to improve the heat insulation performance of the coating, aerogel is usually added to a raw material of the coating in the preparation and production process of the coating, so as to meet the huge market demand of modern buildings and industrial applications; for example, the coating is used for heat insulation for the buildings and is sprayed to liners of the industrial kilns, making the high temperature resistance of the buildings and the industrial kilns better.

Publication No. CN212492884U discloses a coating preparation device, including a reaction barrel main body, wherein a stirring rod is arranged in the reaction barrel main body; a plurality of first stirring blades are arranged on the surface of the stirring rod; a connecting rod is connected to the upper end of the stirring rod and is provided with a motor in a connecting manner; an inlet pipe is arranged on the upper side of the reaction barrel main body; an outlet pipe is arranged on the lower side of the 0baffle plates are arranged on the left side and the right side in the reaction barrel main body respectively; a supporting block is arranged at the lower part of each of the two baffle plates and is connected to the inner wall of the reaction barrel main body in a welding manner; a shape of each baffle plate is consistent to that of a transverse cross-section in the reaction barrel main body; a gap is formed between the two baffle plates and is larger than a diameter of the stirring rod; a fixed piece is arranged at the bottom of the reaction barrel main body; a drive motor is arranged below the fixed piece; a drive rod is connected to the drive motor; a connecting piece is arranged on the surface of the drive rod; second stirring blades are symmetrically connected to the two sides of the connecting piece; and a plurality of propeller blades are arranged on the stirring rod among the plurality of the first stirring blades. While the utility model can get certain preparation operations of the coating, the process further has the following deficiencies that: first, preparation operations can he conducted on a simple coating only, and there is certain limitations; second, a pretreatment step cannot be conducted on various components of a coating raw material before mixing, so as to affect the whole production efficiency and effect and not to meet the production demands of modern enterprises: and third, due to its own weak strength and poor toughness, if the coating of the utility model is added to a heat insulation coating for use, the coating can be weakened in strength and toughness.

In view of this, the present disclosure provides a high-temperature aerogel heat insulation coating, preparation equipment and a use method for the preparation equipment, so as to solve the technical problems in the prior art.

SUMMARY

A purpose of the present disclosure is to provide a high-temperature aerogel heat insulation coating, preparation equipment and a use method for the preparation equipment, so as to solve the technical problems, in the prior art, that the coating preparation equipment has certain limitations, cannot conduct a pretreatment step on various components of a coating raw material before mixing and is low in whole production efficiency and effect, and the costing is low in strength and toughness.

The present disclosure provides the high-temperature aerogel heat insulation coating, including water glass, an aqueous solution, a functional material, a silane coupling agent, dimethyl silicone oil, a film-forming agent, a curing co-agent and a film-forming additive.

Preferably, the functional material is one or more of silicon whiskers, ceramic whiskers, talcum powder and mica powder; the film-forming agent is one or more of sodium silicate, potassium silicate, a styrene-acrylic emulsion, lithium silicate, an acrylic emulsion and a polyurethane emulsion; the curing co-agent is one or more of magnesium oxide, aluminium oxide and sodium fluosilicate; and the film-forming additive is one or more of benzyl alcohol, ethylene glycol butyl ether and propylene glycol phenyl ether alcohol ester-12. The high-temperature aerogel heat insulation coating has a heat conductivity coefficient reaching 0.038 w/m·K, a wet density of 600-700 kg/m$^3$, a dry density of 400-500 kg/m$^3$, a usage amount per square meter of 8-10 kg/m$^3$·10 mm, a construction temperature of 5-50° C., a single-coating thickness less than 6 mm and a volume shrinkage ratio of 20%.

The present disclosure further provides preparation equipment for a high-temperature aerogel heat insulation coating, including an upper outer box, an agitating mechanism, a primary mixing mechanism, a middle layer box, a reaction tank, a crushing mechanism and, a secondary mixing mechanism. The middle layer box is installed at the bottom of the upper outer box; the reaction tank is fixed to the bottom of the middle layer box; a supporting leg frame is arranged on the outer side wall of the reaction tank; the agitating mechanism is installed in the upper outer box and right above the primary mixing mechanism; the primary mixing mechanism is installed in the middle layer box; one end of the primary mixing mechanism is in transmission connection with the crushing mechanism; the crushing mechanism is installed on the inner top of the reaction tank; the secondary mixing mechanism is installed in the reaction tank and below the crushing mechanism; a storage cavity is formed in the upper outer box; a dispersing shaft is arranged at the inner bottom of the storage cavity; the dispersing shaft is provided with dispersing blades; a dispersing motor for driving the dispersing shaft to be fixed is arranged on the outer side wall of the upper outer box; a material guiding pipe being in butt joint to the primary mixing mechanism is arranged on the outer side wall of the upper outer box; an unloading mechanism is arranged at the bottom of the reaction tank; and an exhaust hole and a feeding hole communicating with the reaction tank are formed in the outer side wall of the reaction tank.

Preferably, the agitating mechanism includes a drive motor, a connecting frame, a guide block and two linkage assemblies; the connecting frame is installed on the outer side wall of the upper outer box; the drive motor is fixed to the connecting frame, and the output end of the drive motor is connected with one linkage assembly; the two linkage assemblies are staggered in the upper outer box, the bottom end of each linkage assembly extends into the primary mixing mechanism, and the two linkage assemblies are in transmission cooperation; and the guide block is slidably installed on the inner side wall of the upper outer box and is connected with the top ends of the two linkage assemblies.

Preferably, each linkage assembly includes a transmission gear, an eccentric shaft, a linkage arm, a linkage rod and an agitating blade; each transmission gear is rotationally installed on the connecting frame; the output end of the drive motor is connected with one transmission gear; the two transmission gears are mutually engaged; the eccentric shafts are fixed to eccentric; parts of the transmission gears respectively; the two ends of the linkage assemblies are connected with the corresponding eccentric shafts and the guide block respectively; the top ends of the linkage rods are connected with the bottom ends of the linkage arms; and the bottom ends of the linkage rods extend into the primary mixing mechanism and are connected with the agitating blades.

Preferably, the primary mixing mechanism includes a material supporting tank, a rotating fluted disc, a worm and a servo motor; the rotating fluted disc is rotationally installed on the inner bottom wall of the middle layer box; the material supporting tank is, vertically fixed to the rotating fluted disc; the worm is installed in the middle layer box in a horizontal rotating manner and is in transmission connection with the rotating fluted disc; the servo motor is installed on the outer side wall of the middle layer box, and the output end of the servo motor is connected with one end of the worm; a discharge opening communicating with the material supporting tank is formed in the rotating fluted disc; and an electromagnetic valve for controlling opening and closing of the discharge opening is formed in the bottom of the middle layer box.

Preferably, the crushing mechanism includes a driving roller, a driven roller, a driving gear, a driven gear and two synchronous wheels; the driving roller and the driven roller are horizontally installed on the inner top of the reaction tank; the driving gear and the driven gear are connected with one end of the driving roller and one end of the driven roller respectively and are engaged with each other; the two synchronous wheels are installed at the other end of the driving roller and the other end of the worm respectively; and a synchronous belt is sleeved outside the two synchronous wheels.

Preferably, the secondary mixing mechanism includes a mounting frame, a stirring shaft, a plurality of swirling blades and a rotating assembly; the mounting frame is horizontally fixed in the reaction tank and located below the driving roller; the stirring shaft is vertically arranged, and the two ends of the stirring shaft are rotationally connected with the mounting frame and the inner bottom wall of the reaction tank respectively; the plurality of swirling blades are circumferentially and uniformly distributed on the stirring shaft; and the rotating assembly is installed on the reaction tank and is in transmission connection, with the top end of the stirring shaft.

Preferably, the rotating assembly includes a stepping motor, a drive shaft, a main umbrella gear and an auxiliary umbrella gear; the stepping motor is mounted on the supporting leg frame, and the output end of the stepping motor is connected with one end of the drive shaft; the drive shaft is arranged in the reaction tank in the horizontal rotating manner; the main umbrella gear is fixed to the drive shaft; and the auxiliary umbrella gear is fixed to the top end of the stirring shaft and is engaged, with the main umbrella gear.

Preferably, the discharge hole is formed in the bottom of the reaction tank; the reaction tank is of a hollow structure and is internally provided with a heating electric wire; the unloading mechanism includes an L-shaped plate, an unloading motor and a rotating plate; the L-shaped plate is fixed to the bottom of the reaction tank; the rotating plate is rotationally installed at the bottom of the reaction tank; and the unloading motor is installed on the L-shaped plate, and the output end of the unloading motor is connected with the rotating plate.

The present disclosure further provides a use method for the preparation equipment for the high-temperature aerogel heat insulation coating, specifically including the following steps:

(1) An aerogel coating raw material drops into a material supporting tank from a storage cavity, wherein a dispersing motor drives a dispersing shaft connected with the output end of the dispersing motor and dispersing blades on the dispersing shaft to rotate for conducting a dispersion step on the aerogel coating raw material, thereby improving the subsequent: mixing efficiency and effect.

(2) After the aerogel coating raw material drops into the material supporting tank, a raw material and water without requiring pretreatment are introduced into the material supporting tank through a material guiding pipe; the drive motor drives one linkage assembly connected with the output end of the drive motor to work for primarily mixing the raw materials in the material supporting tank to form silica aerogel; under the mutual transmission of the two linkage assemblies, the raw materials are further mixed; the guide block conducts guide limitation on stirring tracks of the two linkage assemblies; and meanwhile, a servo motor drives a worm connected with the output end of the servo motor to rotate, and then drives a rotating fluted disc in transmission connection with the worm and the material supporting tank arranged on the rotating fluted disc to synchronously rotate, thereby further improving the production efficiency and effect of the silica aerogel.

(3) After the silica aerogel is formed, an electromagnetic valve controls a discharge opening to open, and the silica aerogel drops into the reaction tank through the discharge opening, wherein the worm rotates to drive one synchronous wheel connected with one end of the worm to rotate and drives a driving roller connected with the other synchronous wheel to rotate under the effect of the synchronous belt; under the mutual engagement of the driving gear and the driven gear, the driven roller synchronously rotates, so that the dropping silica aerogel can be crushed to, make the particle size be 10-60 nm; and then, a film-forming agent, a curing co-agent and a film-forming additive are sequentially introduced into the reaction tank through a feeding hole.

(4) A stepping motor is used for driving a main umbrella gear on the drive shaft to rotate and then drives an auxiliary umbrella gear engaged with the main umbrella gear and a stirring shall: connected with the auxiliary umbrella gear to rotate; then, a plurality of swirling blades synchronously rotate to finally mix various raw materials in the reaction tank; and meanwhile, a heating electric wire controls a temperature in the reaction tank, so as to achieve the purpose of drying and producing a silicon dioxide aerogel coating.

(5) The discharge hole at the bottom of the reaction tank is opened by driving the rotating plate to rotate by the unloading motor, so as to finish an automatic unloading step of the silicon dioxide aerogel coating.

Compared with the prior art, the present disclosure has the beneficial effects that:

The aerogel coating raw material drops into the material supporting tank from the storage cavity, wherein the dispersing motor drives the dispersing shaft connected with the output end of the dispersing motor and the dispersing blades on the dispersing shaft to rotate for conducting the dispersion step on the aerogel coating raw material, so that the subsequent mixing efficiency and effect are improving. After the aerogel coating raw material drops into the material supporting tank, the raw material and water without requiring pretreatment are introduced into the material supporting tank through the material guiding pipe; the drive motor drives one transmission gear connected with the output end of the drive motor to rotate; under mutual engagement of the two transmission gears, eccentric shafts on the transmission gears and linkage arms, linkage rods and agitating blades which are connected with the eccentric shafts to synchronously rotate; the guide block conducts guide limitation on the rotating tracks of the two linkage assemblies; compared with an existing stirring mode, with a rotating mode of the agitating blades, an agitating range is large, and agitating directions of the two agitating blades are opposite, so that various raw materials can he fully mixed, and the mixing efficiency and effect are improved, so as to implement the primary mixing step for the raw materials in the material supporting tank and form the silica aerogel; and meanwhile, the servo motor drives the worm connected with the output end of the servo motor to rotate, and then drives the rotating fluted disc in transmission connection with the W01111 and the material supporting tank arranged on the rotating fluted disc to synchronously rotate, thereby further improving the production efficiency and effect of the silica aerogel. After the silica aerogel is formed, the electromagnetic valve controls the discharge opening to open, and the silica aerogel drops into the reaction tank through the discharge opening, wherein the worm rotates to drive one synchronous wheel connected with one end of the worm to rotate and drives the driving roller connected with the other synchronous wheel to rotate under the effect of the synchronous belt; under the mutual engagement of the driving gear and the driven gear, the driven roller synchronously rotates, so that the dropping silica aerogel can be crushed to make the particle size be 10-60 nm; and then, the film-forming agent, the curing co-agent and the film-forming additive are sequentially introduced into the reaction tank through the feeding hole. The stepping motor is used for driving the main umbrella gear on the drive shaft to rotate and then drives the auxiliary umbrella gear engaged with the, main umbrella gear and the stirring shaft connected with the auxiliary umbrella gear to rotate; then, the plurality of swirling blades synchronously rotate to finally mix various raw materials in the reaction tank; and meanwhile, the heating electric wire controls the temperature in the reaction tank, so as to achieve the purpose of drying and producing the silicon dioxide aerogel coating. The discharge hole at the bottom of the reaction tank is opened by driving the rotating plate to rotate by the unloading motor, so as to finish the automatic unloading step of the silicon dioxide aerogel coating. The present disclosure can conduct automatic preparation operations on various types of coatings, so that the production demands of the modern enterprises can be met: and the pretreatment step can further be conducted on various components of the coating raw material before, production and mixing, so that the whole production efficiency and effect are improved; and the coating is high in strength and toughness own and is strong in practicability.

BRIEF DESCRIPTION OF DRAWINGS

In order to more clearly illustrate the specific implementations of the present disclosure or the technical solutions in the prior art, the accompanying drawings required in descriptions of the specific implementations or the prior art will be simply introduced below. Apparently, the accompanying drawings in the following description are some implementations of the present disclosure, and persons of ordinary skill in the art may still derive other drawings from these accompanying drawings without creative effort.

REFERENCE NUMERALS

Figure 1:
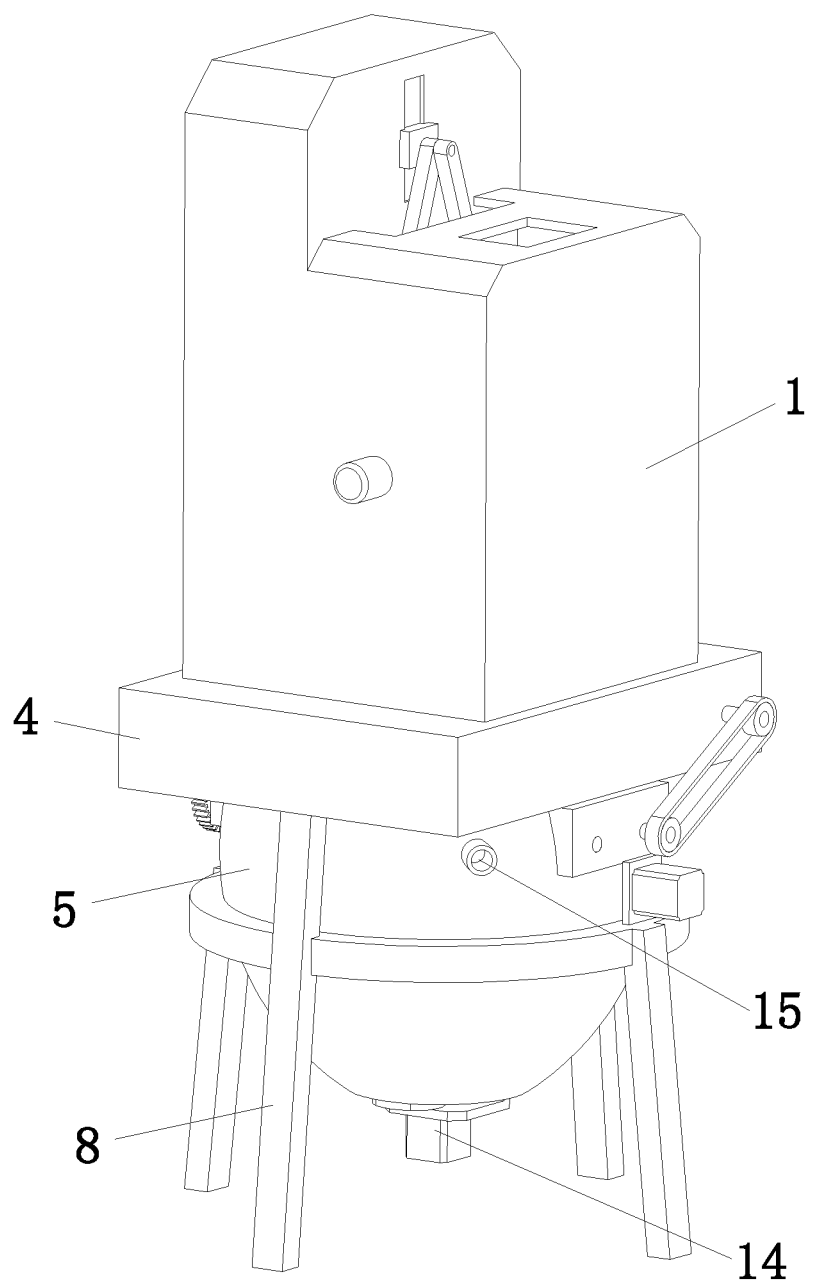
FIG. 1 is a stereoscopic structural schematic diagram I of the present disclosure.

Upper outer box 1, agitating mechanism 2, drive motor 21, connecting frame 22, guide block 23, linkage assembly 24, transmission gear 241, eccentric shaft 242, linkage arm 243, linkage rod 244, agitating blade 245, primary mixing mechanism 3, material supporting tank 31, rotating, fluted disc 32, worm 33, servo motor 34, discharge opening 35, electromagnetic valve 36, middle layer box 4, reaction tank 5, crushing mechanism 6, driving roller 61, driven roller 62, driving gear 63, driven gear 64, synchronous wheel 65, synchronous belt 66, secondary mixing mechanism 7, mounting frame 71, stirring shaft 72, swirling blade 73, rotating assembly 74, stepping motor 741, drive shaft 742, main umbrella gear 743, auxiliary umbrella gear 744, supporting leg frame 8, storage cavity 9, dispersing shaft 10, dispersing blade 11, dispersing motor 12, material guiding pipe 13, unloading mechanism 14, L-shaped plate 141, unloading motor 142, rotating plate 143, exhaust hole 15, feeding hole 16, heating electric wire 17.

DETAILED DESCRIPTION OF THE EMBODIMENTS

The technical solutions of the present disclosure will be described clearly and completely in combination with the drawings below. Apparently, the embodiments described are only a part of embodiments of the present disclosure, and are not all of embodiments thereof.

In general, assemblies of the embodiments of the present disclosure described and displayed in the drawings may be arranged and designed in various configurations. Therefore, the following detailed description of the embodiments of the present disclosure, as presented in the drawings, is not intended to limit the scope of the present disclosure, as claimed, but is merely representative of selected embodiments of the present disclosure.

All other embodiments that persons of ordinary skill in the art obtain without creative efforts based on the embodiments of the present disclosure also fall within the scope of the present disclosure.

In the descriptions of the present disclosure, it should be understood that orientations or positional relationships indicated by the terms "center", "upper", "lower", "left", "right", "vertical", "horizontal", "inner", "outer" and the like are orientations or positional relationships shown based on the drawings, which are for convenience in description of the present disclosure and simplified description merely, but not for indicating or implying that the devices or elements referred to must have the specific orientations and constructed or operated in the specific orientations. Therefore, they shall not be understood as limitations of the present disclosure. In addition, the terms "first", "second" and "third" are only used for purposes of description and cannot be understood as indicating or implying the relative importance.

In the description of the present disclosure, it should be noted that unless specified or limited otherwise, the terms "mounted", "coupled" and "connected" should be broadly understood, for example, it may be fixed connection, detachable connection or integral connection; it may he mechanical connection or electric connection; it may he direct connection or connection via an intermediary medium, or two elements may communicate inside. Persons of ordinary skill in the art may understand the specific meanings of the above terms in the present disclosure based on the specific situations.

Embodiment 1

This embodiment discloses a high-temperature aerogel heat insulation coating, including water glass, an aqueous solution, a functional material, a silane coupling agent, dimethyl silicone oil, a film-forming agent, a curing co-agent and a film-forming additive.

Further, the functional material is one or more of silicon whiskers, ceramic whiskers, talcum powder and mica powder.

Further, the film-forming agent is one or more of sodium silicate, potassium silicate, a styrene-acrylic emulsion, lithium silicate, an acrylic emulsion and a polyurethane emulsion; and the curing co-agent is one or more of magnesium oxide, aluminium oxide and sodium fluosilicate, Further, the film-forming additive is one or more of benzyl alcohol, ethylene glycol butyl ether and propylene glycol phenyl ether alcohol ester-12.

Through a test, the high-temperature aerogel heat insulation coating, has a heat conductivity coefficient reaching 0.038 w/m·K, a wet density of 600-700 $kg/m^3$, a dry density of 400-500 $kg/m^3$, a usage amount per square meter of 8-10 $kg/m^3$·10 mm, a construction temperature of 5-50° C., a single-coating thickness less than 6 min and a volume shrinkage ratio of 20%.

Embodiment 2

Figure 2:
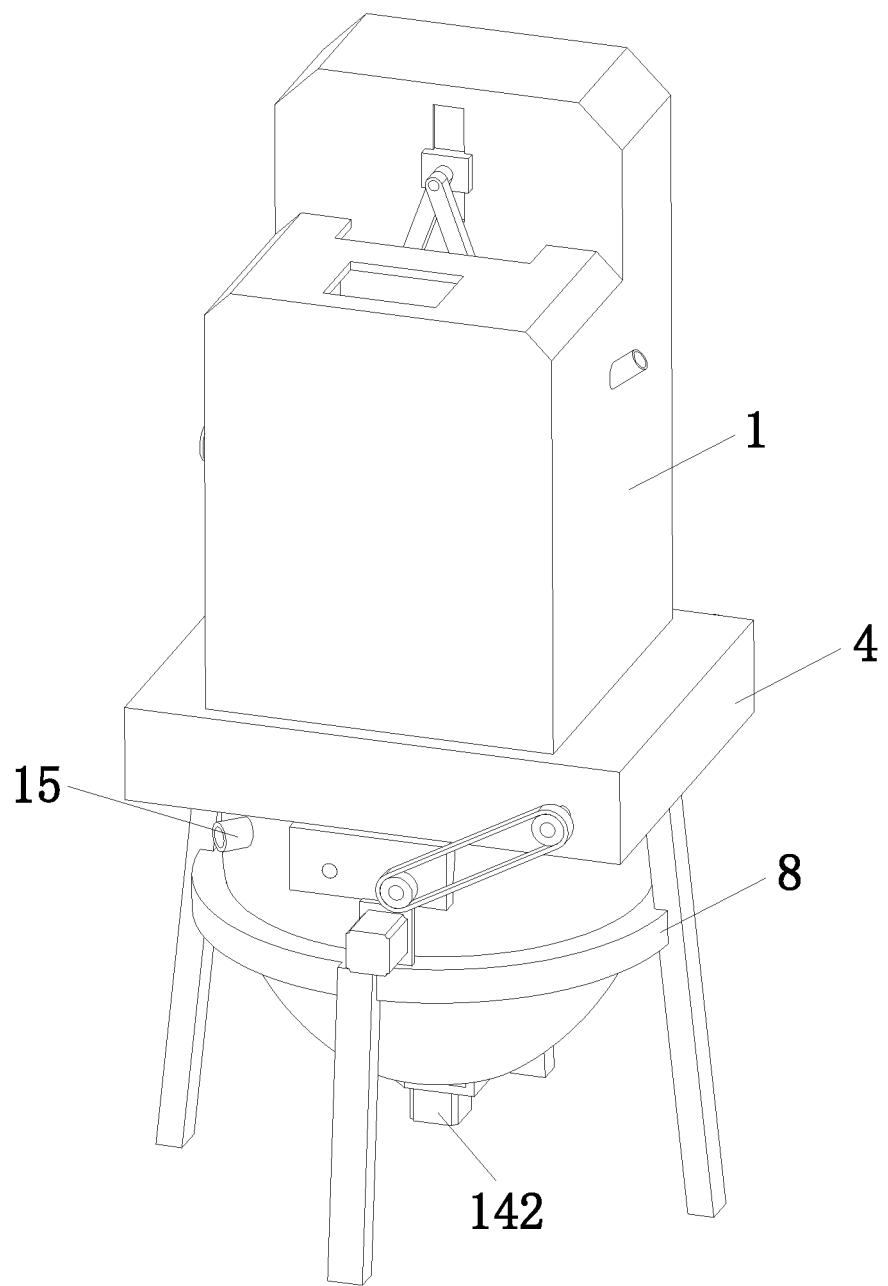
FIG. 2 is a stereoscopic structural schematic diagram II of the present disclosure.
Figure 3:
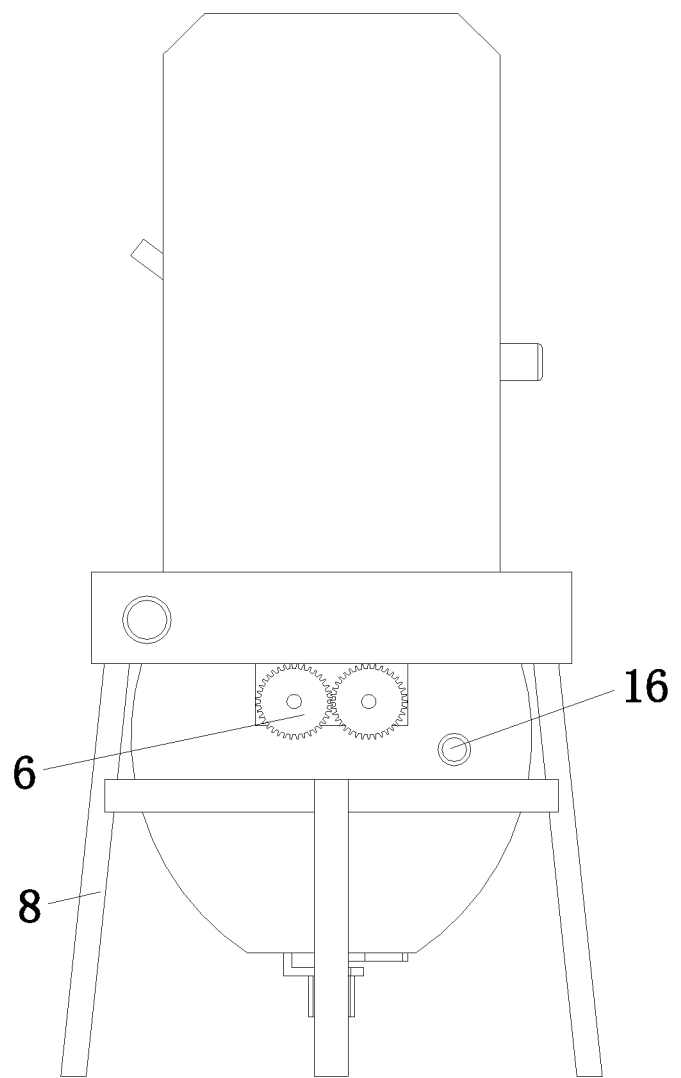
FIG. 3 is a side view of the present disclosure.
Figure 4:
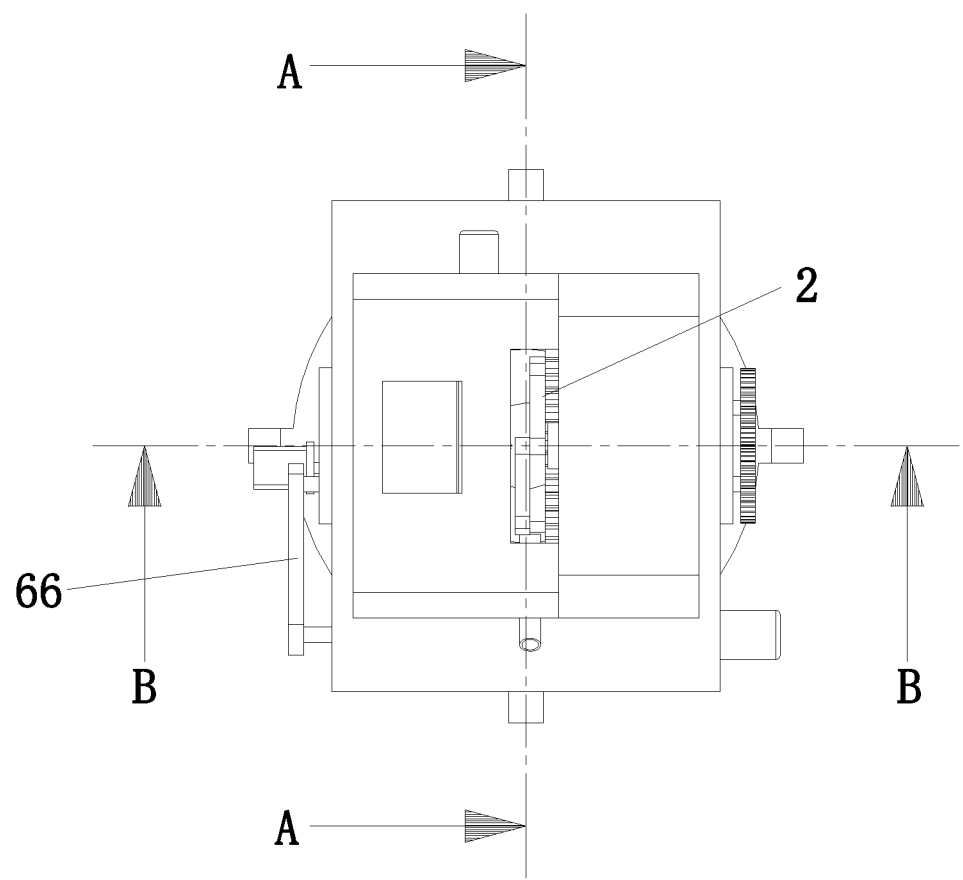
FIG. 4 is a top view of the present disclosure.
Figure 5:
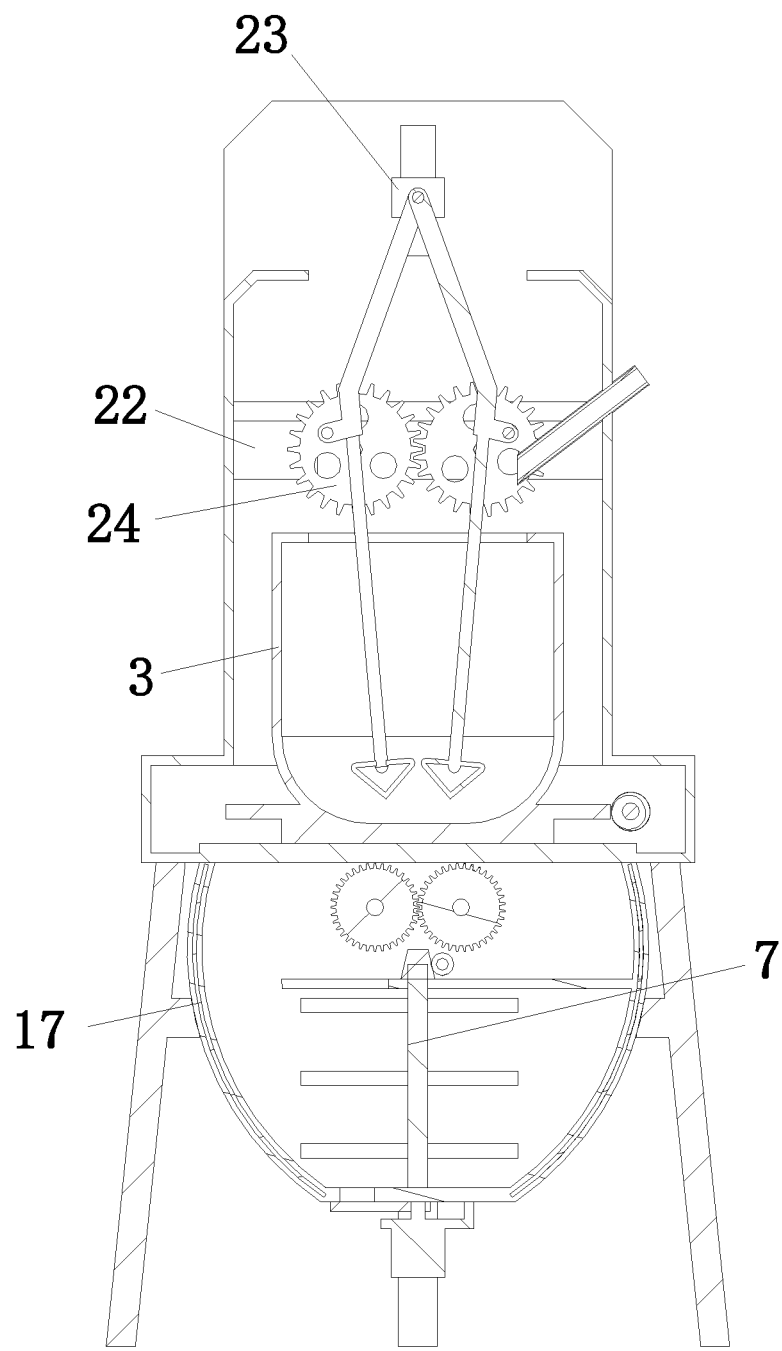
FIG. 5 is a sectional view along a line A-A in FIG. 4 of the present disclosure.
Figure 6:
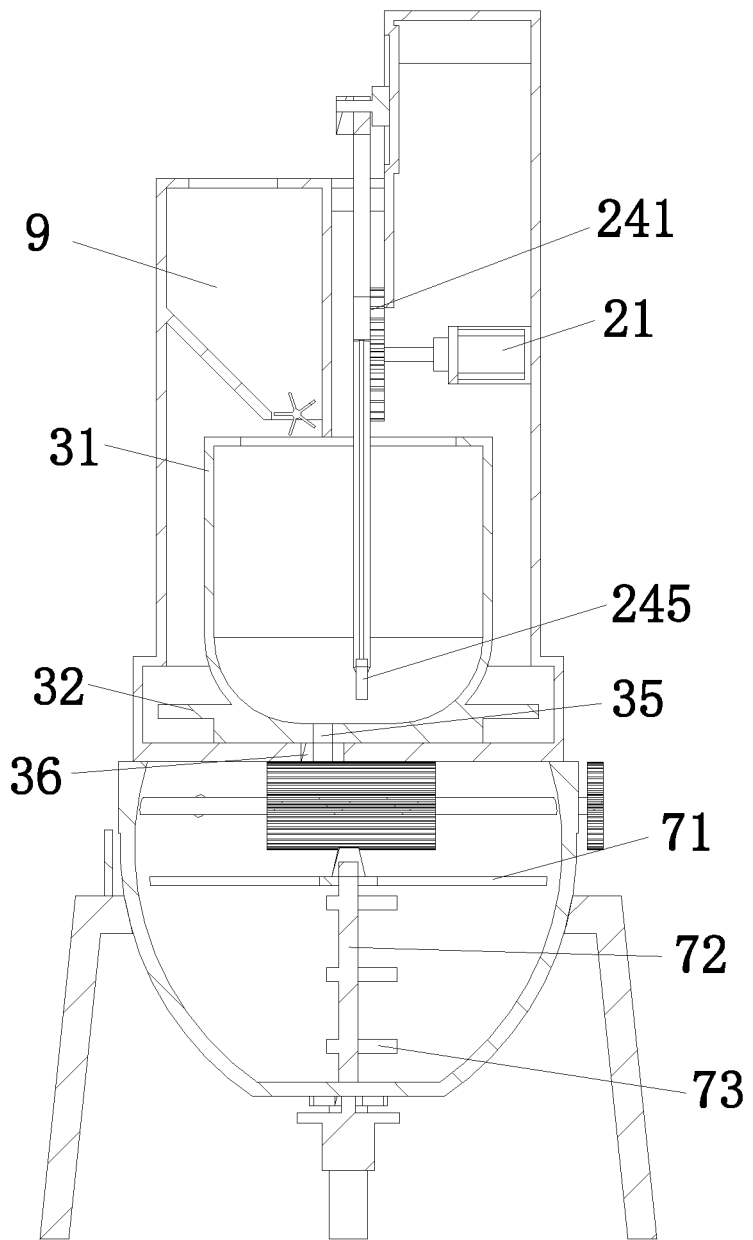
FIG. 6 is a sectional view along a line B-B in FIG, 4 of the present disclosure.
Figure 7:
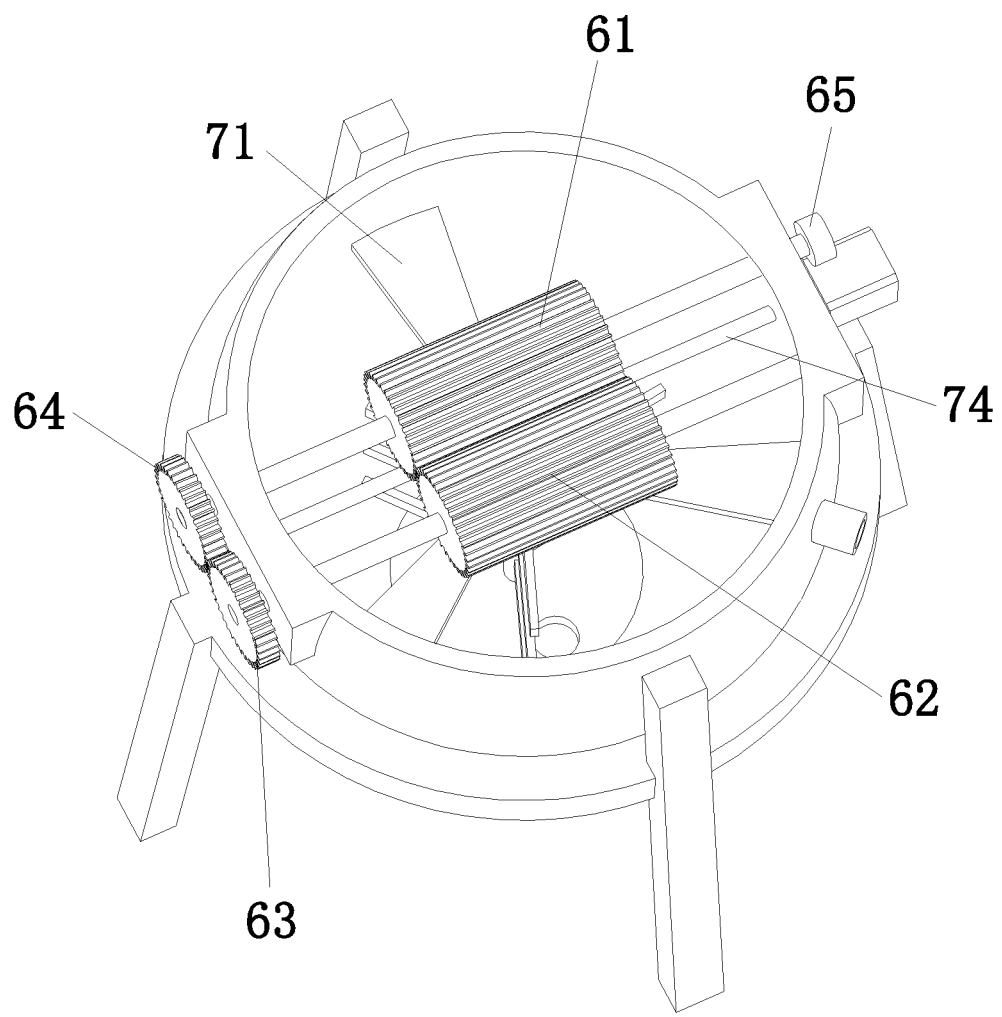
FIG. 7 is a local stereoscopic structural schematic diagram of the present disclosure.
Figure 8:
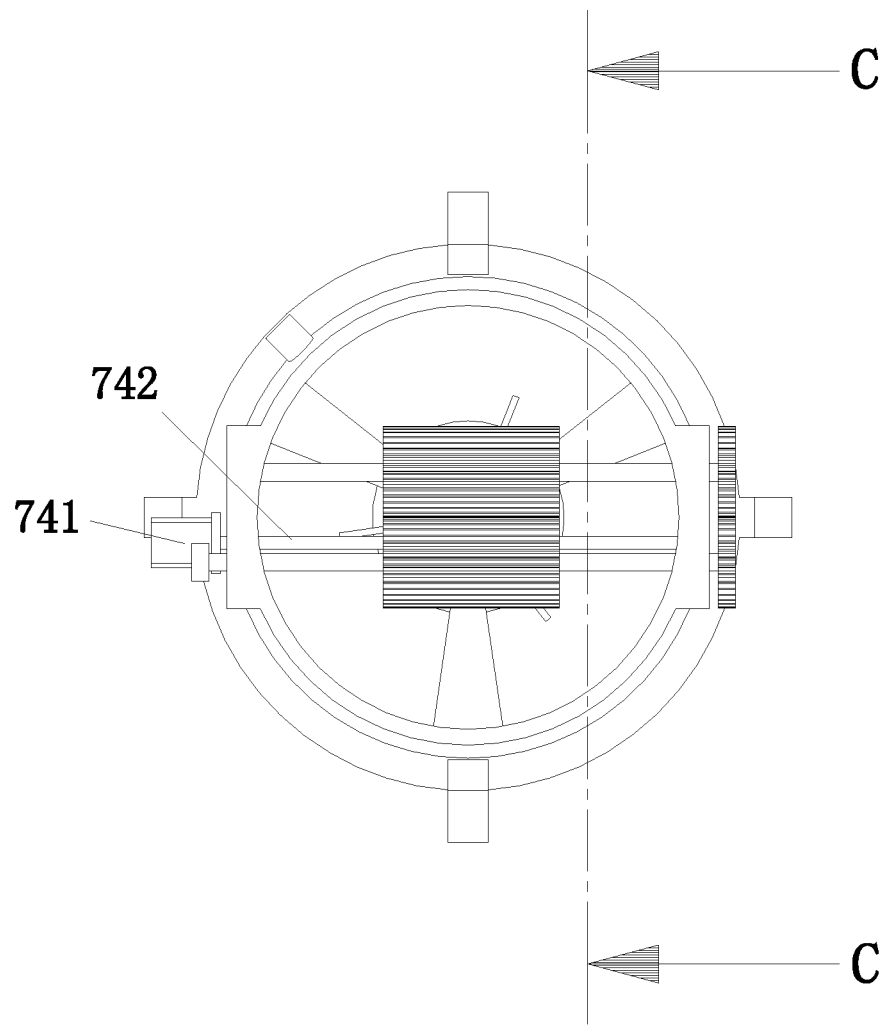
FIG. 8 is a top view of FIG. 7 of the present disclosure.
Figure 9:
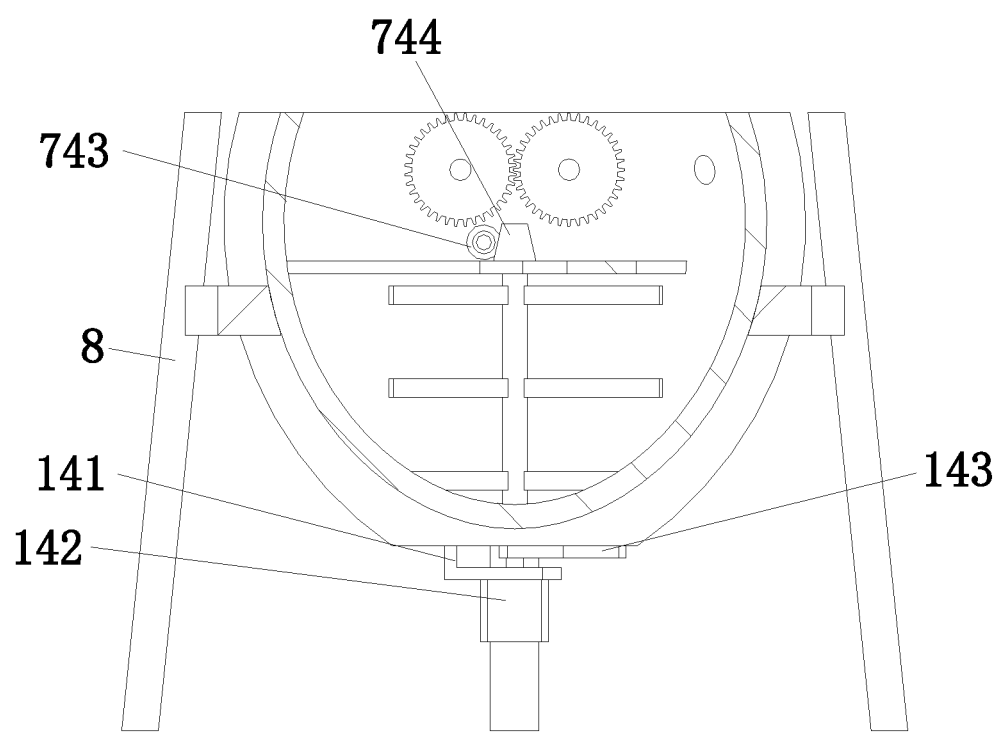
FIG. 9 is a sectional view along a line C-C in FIG. 8 of the present disclosure.
Figure 10:
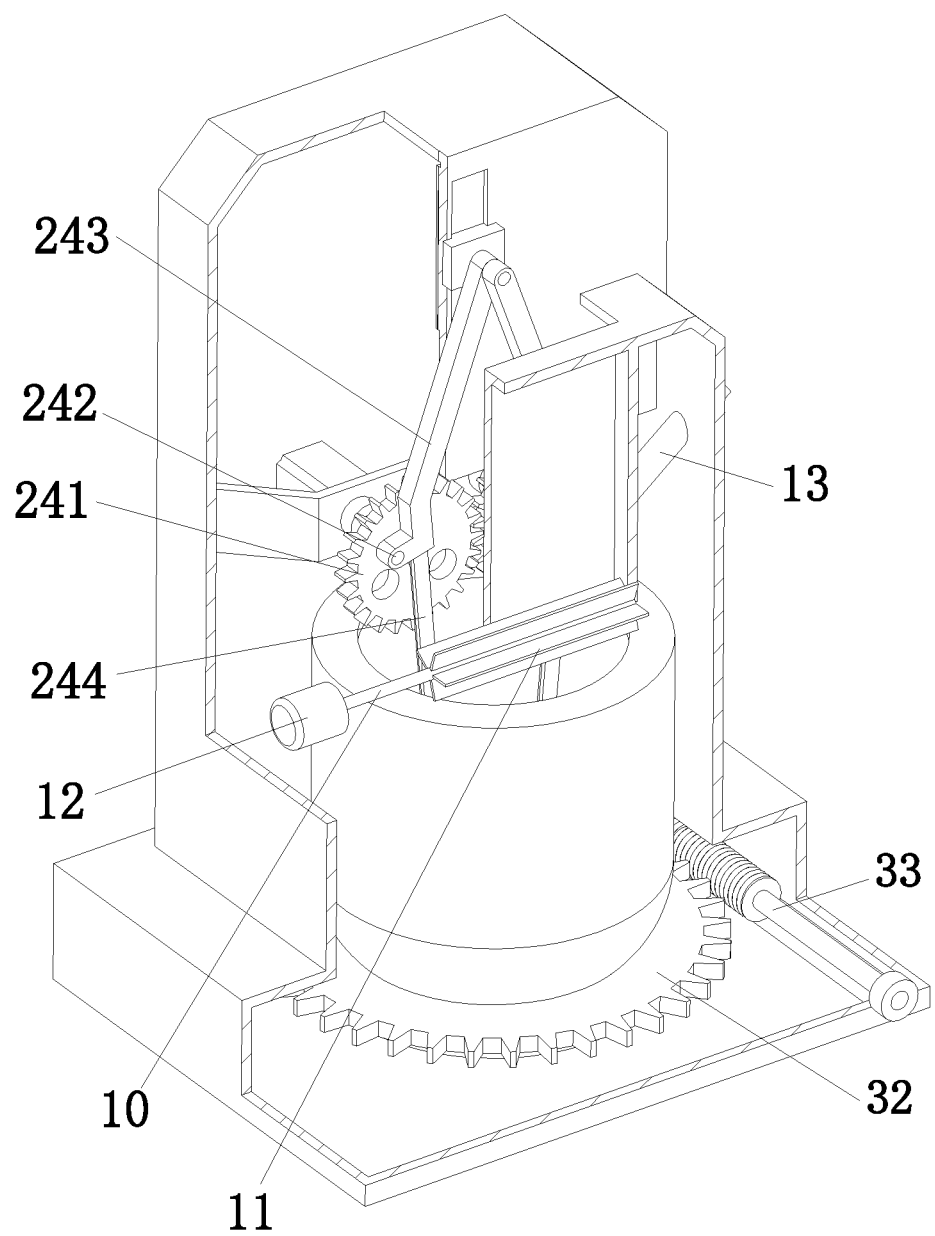
FIG. 10 is a local stereoscopic structural sectional view of the present disclosure.
Figure 11:
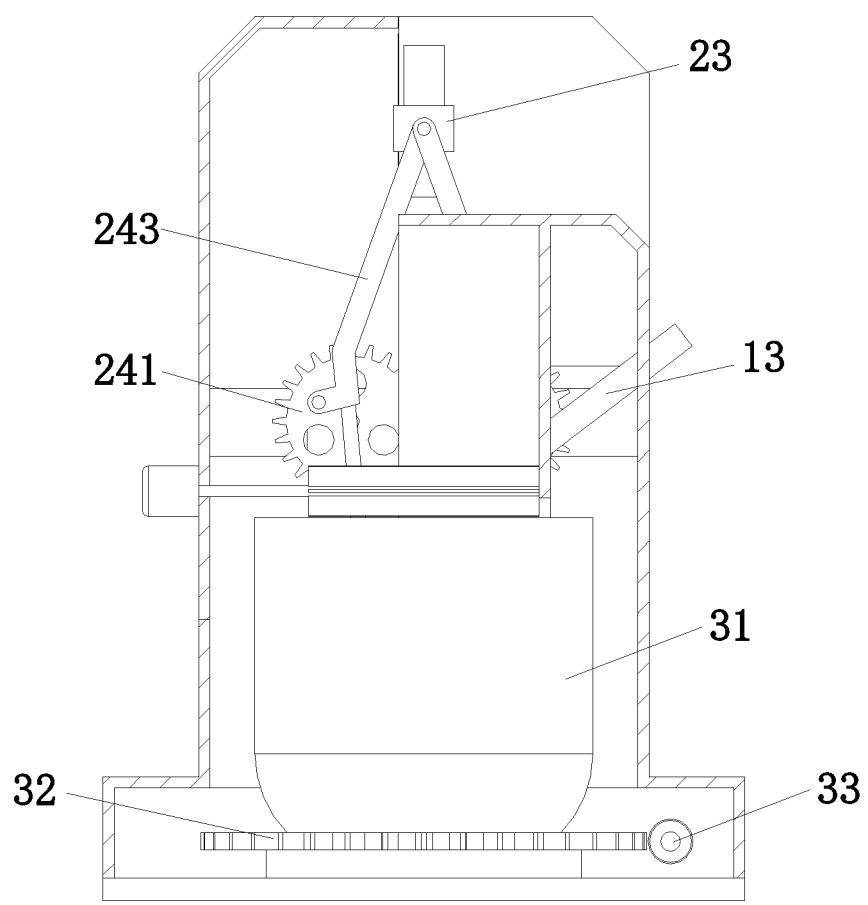
FIG. 11 is a front view of FIG. 10 of the present disclosure.
Figure 12:
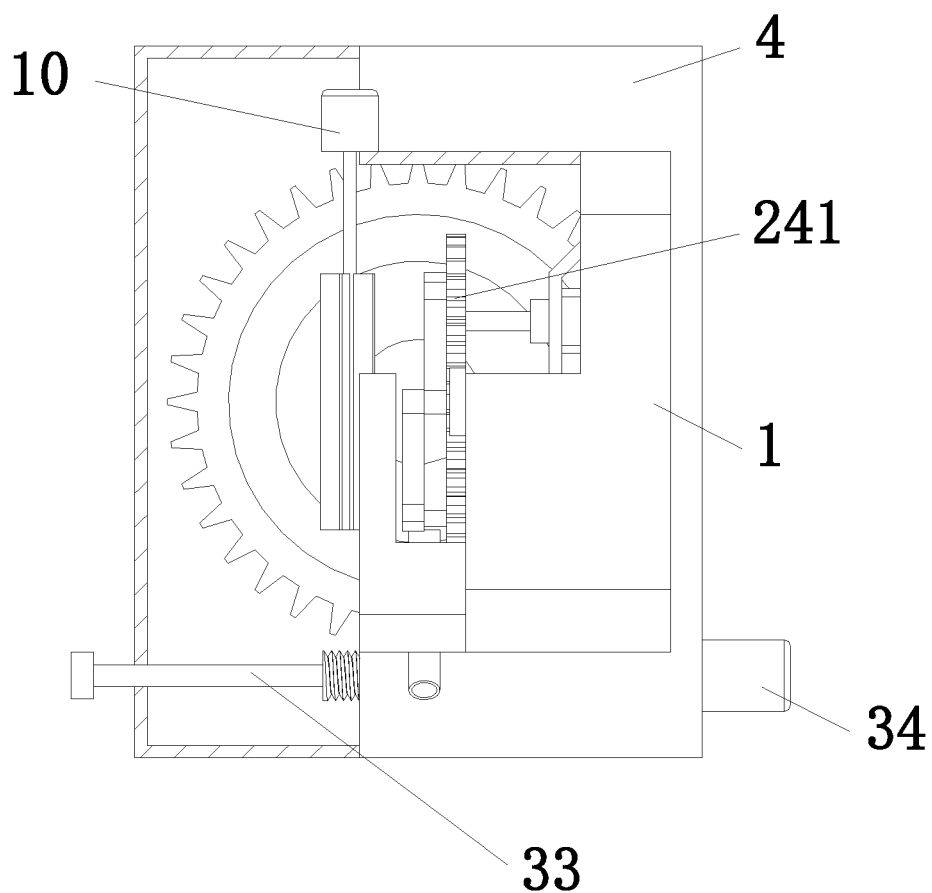
FIG. 12 is a'top view of FIG. 10 of the present disclosure.

Referring to FIGS. 1-12, this embodiment discloses preparation equipment for a high-temperature aerogel heat insulation coating, including an upper outer box 1, an agitating mechanism 2, a primary mixing mechanism 3, a middle layer box 4, a reaction tank 5, a crushing mechanism 6 and a secondary mixing mechanism 7. The middle layer box 4 is installed at the bottom of the upper outer box 1; the reaction tank 5 is fixed to the bottom of the middle layer box 4; a supporting leg frame 8 is arranged on the outer side wall of the reaction tank 5; the agitating mechanism 2 is installed in the upper outer box 1 and right above the primary mixing mechanism 3; the primary mixing mechanism 3 is installed in the middle layer box 4; one end of the primary mixing mechanism 3 is in transmission connection with the crushing mechanism 6; the crushing mechanism 6 is installed on the inner top of the reaction tank 5; the secondary mixing mechanism 7 is installed in the reaction tank 5 and below the crushing mechanism 6; a storage cavity 9 is famed in the upper outer box 1: a dispersing shaft 10 is arranged at the inner bottom of the storage cavity 9: the dispersing shaft 10 is provided with dispersing blades 11; a dispersing motor 12 for driving the dispersing shaft 10 to be fixed is arranged on the outer side wall of the upper outer box 1; a material guiding pipe 13 being in butt joint to the primary mixing mechanism 3 is arranged on the outer side wall of the upper outer box 1; an unloading mechanism 14 is arranged at the bottom of the reaction tank 5; and an exhaust hole 15 and a feeding hole 16 communicating with the reaction tank 5 are formed in the outer side wall of the reaction tank 5.

Further, the agitating mechanism 2 includes a drive motor 21, a connecting frame 22, a guide block 23 and two linkage assemblies 24; the connecting frame 22 is installed on the outer side wall of the upper outer box 1; the drive motor 21 is fixed to the connecting frame 22, and the output end of the drive motor 21 is connected with one linkage assembly 24; the two linkage assemblies 24 are staggered in the upper outer box 1, the bottom end of each linkage assembly 24 extends into the primary mixing mechanism 3, and the two linkage assemblies 24 are in transmission cooperation; and the guide block 23 is slidably installed on the inner side wall of the upper outer box 1 and is connected with the top ends of the two linkage assemblies 24. After the aerogel coating raw material drops into the material supporting tank 31, a raw material and water without requiring pretreatment are introduced into the material supporting tank 31 through a material guiding pipe 13; the drive motor 21 drives one linkage assembly 24 connected with the output end of the drive motor 21 to work, for primarily mixing the raw immaterial in the material supporting tank 31 to form silica aerogel; and under the mutual transmission of the two linkage assemblies 24, the raw materials are further mixed, the guide block 23 conducts guide limitation on stirring tracks of the two linkage assemblies 24.

Further, each linkage assembly 24 includes a transmission gear 241, an eccentric shaft 242, a linkage arm 243, a linkage rod 244 and an agitating blade 245; each transmission gear 241 is rotationally installed on the connecting frame 22; the output end of the drive motor 21 is connected with one transmission gear 241; the two transmission gears 241 are mutually engaged; the eccentric shafts 242 are fixed to eccentric parts of the transmission gears 241 respectively; the two ends of the linkage assemblies 243 are connected with the corresponding eccentric shafts 242 and the guide block 23 respectively; the top ends of the linkage rods 244 are connected with the bottom ends of the linkage arms 243: and the bottom ends of the linkage rods 244 extend into the primary mixing mechanism 3 and are connected with the agitating blades 245. By driving one transmission gear 241 connected with the output end of the drive motor 21 by the drive motor 21 to rotate, under mutual engagement of the two transmission gears 241, eccentric shafts 242 on the transmission gears 241 and linkage anus 243, linkage rods 244 and agitating blades 245 which are connected with the eccentric shafts 242 to synchronously rotate; and the guide block 23 conducts guide limitation on the rotating tracks of the two linkage assemblies 243. Compared with an existing stirring mode, with a rotating mode of the agitating blades 245, an agitating range is large, and agitating directions of the two agitating blades 245 are opposite, so that various raw materials can be fully mixed, and the mixing efficiency and effect are improved.

Further, the primary mixing mechanism 3 includes a material supporting tank 31, a rotating fluted disc 32, a worm 33 and a servo motor 34; the rotating fluted disc 32 is rotationally installed on the inner bottom wall of the middle layer box 4; the material supporting tank 31 is vertically fixed to the rotating fluted disc 32; the worm 33 is installed in the middle layer box 4 in a horizontal rotating manner and is in transmission connection with the rotating fluted disc 32; and the servo motor 34 is installed on the outer side wall of the middle layer box 4, and the output end of the servo motor 34 is connected with one end of the worm 33. The servo motor 34 drives the worm 33 connected with the output end of the servo motor 34 to rotate, and then drives the rotating fluted disc 32 in transmission connection with the worm 33 and the material supporting tank 31 arranged on the rotating fluted disc 32 to synchronously rotate, so that a rotating direction of the material supporting tank 31 is opposite to those of the two agitating blades 245, thereby further improving the production efficiency and effect of silica aerogel. A discharge opening 35 communicating with the material supporting tank 31 is formed in the rotating fluted disc 32; and an electromagnetic valve 36 for controlling opening and closing of the discharge opening 35 is formed in the bottom of the middle layer box 4.

Further, the crushing mechanism 6 includes a driving roller 61, a driven roller 62, a driving gear 63, a driven gear 64 and two synchronous wheels 65; the driving roller 61 and the driven roller 62 arc horizontally installed on the inner top of the reaction tank 5; the driving gear 63 and the driven gear 64 are connected with one end of the driving roller 61 and one end of the driven roller 62 respectively and are engaged with each other; the two synchronous wheels 65 are installed at the other end of the driving roller 61 and the other end of the worm 33 respectively; and a synchronous belt 66 is sleeved outside the two synchronous wheels 65. When the servo motor 34 drives the worm 33 to rotate, the worm 33 rotates to drive one synchronous wheel 65 connected with one end of the worm 33 to rotate and drives the driving roller 61 connected with the other synchronous wheel 65 to rotate under the effect of the synchronous belt 66; under the mutual engagement of the driving gear 63 and the driven gear 64, the driven roller 62 synchronously rotates, so that the dropping silica aerogel can be crushed. Therefore, the structure is ingenious; the use of a drive element is reduced; and crushing pretreatment on the raw materials of the aerogel coating can further be achieved, so as to improve the production efficiency and effect.

Further, the secondary mixing mechanism 7 includes a mounting frame 71, a stirring shaft 72, a plurality of swirling blades 73 and a rotating assembly 74; the mounting frame 71 is horizontally fixed in the reaction tank 5 and located below the driving roller 61; the stirring shall 72 is vertically arranged, and the two ends of the stirring shaft 72 are rotationally connected with the mounting frame 71 and the inner bottom :all of the reaction tank 5 respectively; the plurality of swirling blades 73 are circumferentially and uniformly distributed on the stirring shaft 72; and the rotating assembly 74 is installed on the reaction tank 5 and is in transmission connection with the top end of the stirring shaft 72. By driving the stirring shaft 72 and the plurality of swirling blades 73 to rotate by the rotating assembly 74, a final uniform mixing step can be conducted on various raw materials in the reaction tank 5.

Further, the rotating assembly 74 includes a stepping motor 741, a drive shaft 742, a main umbrella gear 743 and an auxiliary umbrella gear 744; the stepping motor 741 is mounted on the. supporting leg frame 8, and the output end of the stepping motor 741 is connected with one end of the drive shaft 742; the drive shaft 742 is arranged in the reaction tank 5 in the horizontal rotating manner; the main umbrella gear 743 is fixed to the drive shaft 742; and the auxiliary umbrella gear 744 is fixed to the top end of the stirring shaft 72 and is engaged with the main umbrella gear 743. The stepping motor 731 is used for driving the main umbrella gear 743 on the drive shaft 742 to rotate and then drives an auxiliary umbrella gear 744 engaged with the main umbrella gear 743 and the stirring shaft 72 connected with the auxiliary umbrella gear 744 to rotate; and then, a plurality of swirling blades 73 synchronously rotate to conduct a final mixing step on various raw materials in the reaction tank 5, thereby improving the whole production efficiency and effect, Further, the discharge hole is Rimed in the bottom of the reaction tank 5; the reaction tank 5 is of a hollow structure and is internally provided with a heating electric wire 17; and the heating electric wire 17 controls a temperature in the reaction tank 5, so as to achieve the purpose of drying. and producing silicon dioxide aerogel. The unloading mechanism 14 includes an L-shaped plate 141, an unloading motor 142 and a rotating plate 143; the L-shaped plate 141 is fixed to the bottom of the reaction tank 5; the rotating plate 143 is rotationally installed at the bottom of the reaction tank 5; and the unloading motor 142 is installed on the L-shaped plate 141, and the output end of the unloading motor 142 is connected with the rotating plate 143. By driving the rotating plate 143 by the unloading motor 142 to rotate, the discharge hole at the bottom of the reaction tank 5 is opened, and then an automatic unloading step of the silicon dioxide aerogel coating is finished.

Embodiment 3

This embodiment discloses a use method for preparation equipment for a high-temperature aerogel heat insulation coating, specifically including the following steps:

(1) An aerogel coating raw material drops into a material supporting tank 31 from a storage cavity 9, wherein a dispersing motor 12 drives a dispersing shaft 10 connected with the output end of the dispersing motor 12 and dispersing blades 11 on the dispersing shaft to rotate for conducting a dispersion step on the aerogel coating raw material, thereby improving the subsequent mixing efficiency and effect.

(2) After the aerogel coating raw material drops into the material supporting tank 31, a raw material and water without requiring pretreatment are introduced into the material supporting tank 31 through a material guiding pipe 13; a drive motor 31 drives one linkage assembly 24 connected with the output end of the drive motor 21 to work, for primarily mixing the raw materials in the material supporting tank 31 to form silica aerogel; under the mutual transmission of the two linkage assemblies 24, the raw materials are further mixed, a guide block 23 conducts guide limitation on stirring tracks of the two linkage assemblies 24; and meanwhile, a servo motor 34 drives a worm 33 connected with the output end of the servo motor 34 to rotate, and then drives a rotating fluted disc 32 in transmission connection with the worm 33 and the material supporting tank 31 arranged on the rotating fluted disc 32 to synchronously rotate, thereby further improving the production efficiency and effect of the silica aerogel.

(3) After the silica aerogel is formed, an electromagnetic valve 36 controls a discharge opening 35 to open, and the silica aerogel drops into the reaction tank 5 through the discharge opening 35, wherein the worm 33 rotates to drive one synchronous wheel 65 connected with one end of the worm 33 to rotate and drives a driving roller 61 connected with the other synchronous wheel 65 to rotate under the effect of the synchronous belt 66; under the mutual engagement of the driving gear 63 and the driven gear 64, the driven roller 62 synchronously rotates, so that the dropping silica aerogel can be crushed to make the particle size be 10-60 nm; and then, a film-forming agent, a curing co-agent and a film-forming additive are sequentially introduced into the reaction tank 5 through a feeding hole 16.

(4) A stepping motor 741 is used for driving a main umbrella gear 743 on a drive shaft 742 to rotate and then drives an auxiliary umbrella gear 744 engaged with the main umbrella gear 743 and a stirring shaft 72 connected with the auxiliary umbrella gear 744 to rotate; then, a plurality of swirling blades 73 synchronously rotate to finally mix various raw materials in the reaction tank 5; and meanwhile, a heating electric 17 controls a temperature in the reaction tank 5, so as to achieve the purpose of drying and producing a silicon dioxide aerogel coating.

(5) The discharge hole at the bottom of the reaction tank 5 is opened by driving the rotating plate143 to rotate by an unloading motor 142, so as to finish an automatic unloading step of the silicon dioxide aerogel coating.

Finally, it should be stated that; the above embodiments are only for illustrating the technical solutions of the present disclosure rather than to limit the technical solutions of the present disclosure. While the present disclosure is described in detail in reference with the foregoing embodiments, persons of ordinary skill in the art should understand that the technical solutions recited in the foregoing embodiments may still be modified, or part or all of the technical features therein are substituted with equivalents; however, these modifications or substitutions do not make the essences of the corresponding technical solutions depart from the scope of the technical solutions of various embodiments of the present disclosure.

What is claimed is:
1. Preparation equipment for a high-temperature aerogel heat insulation coating, wherein the high-temperature aerogel heat insulation coating comprises water glass, an aqueous solution, a functional material, a silane coupling agent, dimethyl silicone oil, a film- forming agent, a curing co-agent and a film-forming additive; wherein the functional material is one or more of silicon whiskers, ceramic whiskers, talcum powder and mica powder;

the film-forming agent is one or more of sodium silicate, potassium silicate, a styrene-acrylic emulsion, lithium silicate, an acrylic emulsion and a polyurethane emulsion; the film-forming additive is one or more of benzyl alcohol, ethylene glycol butyl ether and propylene glycol phenyl ether alcohol ester-12; and wherein the heat insulation coating has a heat conductivity coefficient reaching 0.038 w/m·K, a wet density of 600-700 kg/m$^3$, a dry density of 400-500 kg/m3, a construction temperature of 5-50° C., a single-coating thickness less than 6 mm and a volume shrinkage ratio of 20%;

the preparation equipment comprises an upper outer box (1), an agitating mechanism (2), a primary mixing mechanism (3), a middle layer box (4), a reaction tank (5), a crushing mechanism (6) and a secondary mixing mechanism (7); the middle layer box (4) is installed at the bottom of the upper outer box (1); the reaction tank (5) is fixed to the bottom of the middle layer box (4); a supporting leg frame (8) is arranged on the outer side wall of the reaction tank (5); the agitating mechanism (2) is installed in the upper outer box (1) and right above the primary mixing mechanism (3); the primary mixing mechanism (3) is installed in the middle layer box (4); one end of the primary mixing mechanism (3) is in transmission connection with the crushing mechanism (6); the crushing mechanism (6) is installed on the inner top of the reaction tank (5);

the secondary mixing mechanism (7) is installed in the reaction tank (5) and below the crushing mechanism (6); a storage cavity (9) is formed in the upper outer box (1); a dispersing shaft (10) is arranged at the inner bottom of the storage cavity (9); the dispersing shaft (10) is provided with dispersing blades (11); a dispersing motor (12) for driving the dispersing shaft (10) to be fixed is arranged on the outer side wall of the upper outer box (1); a material guiding pipe (13) being in butt joint to the primary mixing mechanism (3) is arranged on the outer side wall of the upper outer box (1); an unloading mechanism (14) is arranged at the bottom of the reaction tank (5); an exhaust hole (15) and a feeding hole (16) communicating with the reaction tank (5) are formed in the outer side wall of the reaction tank (5); the agitating mechanism (2) comprises a drive motor (21), a connecting frame (22), a guide block (23) and two linkage assemblies (24); the connecting frame (22) is installed on the outer side wall of the upper outer box (1); the drive motor (21) is fixed to the connecting frame (22), and the output end of the drive motor (21) is connected with one linkage assembly (24); the two linkage assemblies (24) are staggered in the upper outer box (1), the bottom end of each linkage assembly (24) extends into the primary mixing mechanism (3), and the two linkage assemblies (24) are in transmission cooperation; the guide block (23) is slidably installed on the inner side wall of the upper outer box (1) and is connected with the top ends of the two linkage assemblies (24); each linkage assembly (24) comprises a transmission gear (241), an eccentric shaft (242), a linkage arm (243), a linkage rod (244) and an agitating blade (245); each transmission gear (241) is rotationally installed on the connecting frame (22); the output end of the drive motor (21) is connected with one transmission gear (241); the two transmission gears (241) are mutually engaged; the eccentric shafts (242) are fixed to eccentric parts of the transmission gears (241) respectively; the two ends of the linkage assemblies (243) are connected with the corresponding eccentric shafts (242) and the guide block (23) respectively; the top ends of the linkage rods (244) are connected with the bottom ends of the linkage arms (243); the bottom ends of the linkage rods (244) extend into the primary mixing mechanism (3) and are connected with the agitating blades (245);

the primary mixing mechanism (3) comprises a material supporting tank (31), a rotating fluted disc (32), a worm (33) and a servo motor (34); the rotating fluted disc (32) is rotationally installed on the inner bottom wall of the middle layer box (4); the material supporting tank (31) is vertically fixed to the rotating fluted disc (32); the worm (33) is installed in the middle layer box (4) in a horizontal rotating manner and is in transmission connection with the rotating fluted disc (32); the servo motor (34) is installed on the outer side wall of the middle layer box (4), and the output end of the servo motor (34) is connected with one end of the worm (33); a discharge opening (35) communicating with the material supporting tank (31) is formed in the rotating fluted disc (32);

an electromagnetic valve (36) for controlling opening and closing of the discharge opening (35) is formed in the bottom of the middle layer box (4);

the crushing mechanism (6) comprises a driving roller (61), a driven roller (62), a driving gear (63), a driven gear (64) and two synchronous wheels (65); the driving roller (61) and the driven roller (62) are horizontally installed on the inner top of the reaction tank (5); the driving gear (63) and the driven gear (64) are connected with one end of the driving roller (61) and one end of the driven roller (62) respectively and are engaged with each other; the two synchronous wheels (65) are installed at the other end of the driving roller (61) and the other end of the worm (33) respectively; a synchronous belt (66) is sleeved outside the two synchronous wheels (65);

the secondary mixing mechanism (7) comprises a mounting frame (71), a stirring shaft (72), a plurality of swirling blades (73) and a rotating assembly (74); the mounting frame (71) is horizontally fixed in the reaction tank (5) and located below the driving roller (61); the stirring shaft (72) is vertically arranged, and the two ends of the stirring shaft (72) are rotationally connected with the mounting frame (71) and the inner bottom wall of the reaction tank (5) respectively; the plurality of swirling blades (73) are circumferentially and uniformly distributed on the stirring shaft (72); the rotating assembly (74) is installed on the reaction tank (5) and is in transmission connection with the top end of the stirring shaft (72); and the rotating assembly (74) comprises a stepping motor (741), a drive shaft (742), a main umbrella gear (743) and an auxiliary umbrella gear (744); the stepping motor (741) is mounted on the supporting leg frame (8), and the output end of the stepping motor (741) is connected with one end of the drive shaft (742); the drive shaft (742) is arranged in the reaction tank (5) in the horizontal rotating manner; the main umbrella gear (743) is fixed to the drive shaft (742); and the auxiliary umbrella gear (744) is fixed to the top end of the stirring shaft (72) and is engaged with the main umbrella gear (743).

2. The preparation equipment for the high-temperature aerogel heat insulation coating according to claim 1, wherein a discharge hole is formed in the bottom of the reaction tank (5); the reaction tank (5) is of a hollow structure and is internally provided with a heating electric wire (17); the unloading mechanism (14) comprises an L-shaped plate (141), an unloading motor (142) and a rotating plate (143); the L-shaped plate (141) is fixed to the bottom of the reaction tank (5); the rotating plate (143) is rotationally installed at the bottom of the reaction tank (5); and the unloading motor (142) is installed on the L-shaped plate (141), and the output end of the unloading motor (142) is connected with the rotating plate (143).

\* \* \* \* \*